Aug. 9, 1966     R. L. LOWELL     3,264,810
LAWN IMPLEMENT
Filed Nov. 26, 1963
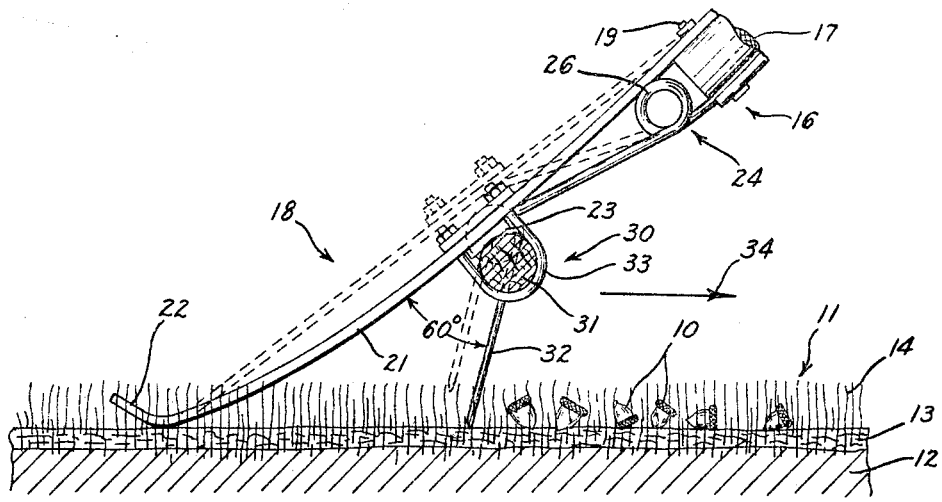
Fig. 1
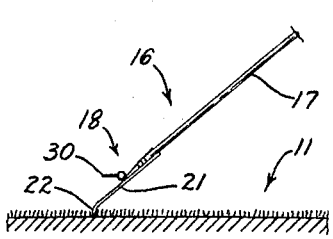
Fig. 5
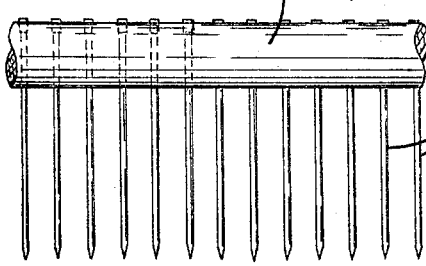
Fig. 4
Fig. 3
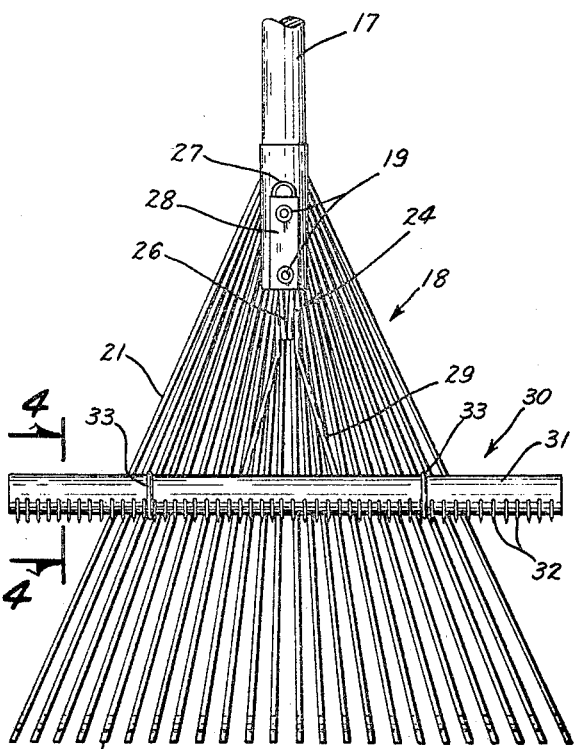
Fig. 2
INVENTOR
RUDOLPH L. LOWELL
BY Richard O. Bartz
ATTORNEY

United States Patent Office 3,264,810
Patented August 9, 1966

3,264,810
LAWN IMPLEMENT
Rudolph L. Lowell, 710 Savings & Loan Bldg.,
Des Moines, Iowa
Filed Nov. 26, 1963, Ser. No. 325,861
10 Claims. (Cl. 56—400.16)

This invention relates to a hand implement and more particularly to a rake for scraping together articles resting on a lawn.

It is the object of this invention to provide an improved rake for gathering together articles, such as acorns, walnuts, hickory nuts resting on the ground.

Another object of the invention is to provide a rake with a resiliently mounted comb unit which facilitates the collection and movement of acorns on the lawn.

A further object of the invention is to provide a rake usable to effectively collect acorns on the lawn without disturbing the mulch on the ground and pulling up grass.

Still another object of the invention is to provide a rake assembly having flexible tines and a comb unit which co-act to produce a combined uniform raking action and a mulch compacting action.

A further object of the invention is to provide a single unit dual purpose rake usable to collect relatively light and bulky articles, such as leaves, and small compact articles such as twigs and acorns.

An additional object of the invention is to provide a new combination leaf and acorn rake which is strong and durable in construction, inexpensive to manufacture, and efficient in operation.

These and other objects of the invention will be apparent from a consideration of the following detailed description and the accompanying drawing wherein:

FIG. 1 is a fragmentary side elevation view of the rake assembly of this invention in the acorn gathering position;

FIG. 2 is a bottom plan view of the rake assembly of FIG. 1;

FIG. 3 is an enlarged fragmentary elevation view of the comb unit of the rake assembly of FIG. 1;

FIG. 4 is an enlarged sectional view taken along the line 4—4 of FIG. 2; and

FIG. 5 is an elevational view of the rake of this invention in the leaf gathering position.

The native oak of North America has been retained in the lawns of residential yards and public parks. When these oaks drop their fruits, the acorns, it is necessary to gather the fallen acorns to preserve the lawn surrounding the oak tree. The numerous and relatively small acorns make this chore monotonous, difficult and time consuming. If the acorns are not gathered and removed from the lawn within a short time after they have fallen the warm and moist environment of the soil will germinate the acorns. An acorn which has germinated has a relatively sturdy root which descends into the soil and rather firmly attaches the acorn to the soil. Germination of the acorn adds to the problem of efficiently gathering acorns because the root is firmly attached to the soil.

Referring to FIG. 1 of the drawing, acorns 10 are pictured resting on a lawn 11 which includes a layer of top soil 12 covered with a blanket of organic mulch 13. Fine lawn grasses 14 are rooted in the top soil 12 and grow upwardly through the mulch 13.

The new combination leaf and acorn rake 16 of this invention is usable to effectively and with a minimum of effort scrape together the acorns 10 into manageable piles without disturbing the layer of organic mulch 13 and without pulling the fine grasses 14 from the soil 12. The rake 16 comprises a cylindrical handle member 17 and a rake assembly 18. A pair of nut and bolt assemblies 19 secure the rake assembly 18 to the lower end section of the handle member 17. The opposite end section of the handle member forms a hand grip for the user of the rake.

The rake assembly 18 has a plurality of flexible leaf spring teeth 21 arranged in a fan-shape in a relative side-by-side relationship to form a common longitudinal plane. The plane of the spring teeth 21 extends substantially parallel to the axis of the handle member 17. As shown in FIG. 2, the leaf spring teeth or tines 21 are of flexible flat steel, are evenly angularly spaced in the fan shape, and have free end sections 22 curved upwardly away from the handle member 17 to form runners for slidable engagement with a ground surface. The space relationship between adjacent spring teeth 21 is maintained by a transverse bar 23 secured to the midsection of each of the teeth 21. The bar is normally on the top side of the teeth 21, when the rake is in a leaf gathering position.

The spring teeth 21 are resiliently stabilized in their common plane by a torsion spring indicated generally by the number 24. As shown in FIG. 2, the spring 24 is a single wire bent into a U-shape, with the midsections 26 of the legs thereof being coiled. The apex section 27 extends around the nut and bolt assemblies 19 and is slidably attached to the handle member 17 by a guide plate 28 mounted on the nut and bolt assemblies 19. The free ends 29 of the legs are attached to the central portion of the transverse bar 23.

As illustrated in FIG. 1, the torsion spring 24 biases the spring teeth 21 to a straight position indicated by broken lines. This straight line position of the spring teeth 21 supplements the normal straight position of the spring teeth 21. In addition, the torsion spring 24 changes the resilient characteristics of the spring teeth 21 longitudinally from the handle end to the free ends 22 by reinforcing the portions of the spring teeth 21 which extend from their midsections to the handle 17. The portions of the spring teeth 21 from their midsections to the free ends 22 are not reinforced by the torsion spring 24 and thus have deflection characteristics which differ from the deflection characteristics of the upper portions of the spring teeth 21.

Referring to FIGS. 1 and 2, a comb unit indicated generally by the reference number 30 extends transversely across the midsections of the spring teeth 21 in alignment with and substantially parallel to the transverse bar 23. The length of the comb unit 29 is substantially equal to the width of the spring teeth 21 across their free ends 22. The comb unit 30 comprises a cylindrical back section 31 and a plurality of rigid teeth 32 secured and projected laterally from one side of the back section 31. As shown in FIGS. 4 and 5, the back section 31 is a cylindrical member formed from wood. The rigid teeth 32 are driven diametrically through the wood member thereby fixedly attaching the rigid teeth 32 to the back section 31. The teeth 32 are positioned in a common plane which includes the longitudinal axis of the cylindrical back section 31. The space between adjacent teeth 32 is substantially uniform along the length of the back section 31 and is of a dimension which prevents acorns from passing through the comb unit. The transverse space between adjacent teeth is variable in accordance with the size of the articles to be collected.

The comb unit 30 is attached to the midsections of the spring teeth or tines 21 by a pair of U-bolt and nut assemblies 33 which are positioned over the cylindrical back section 31 and project between the flexible teeth 21 on opposite sides of the transverse bar 23. The bolt and nut assemblies 33 function to positively clamp the comb unit 30 to the transverse bar 23.

The plane of the plurality of rigid teeth 32 forms an acute angle with the free end sections of the plurality of flexible spring teeth 21. As seen in FIG. 1, this angle is about 60 degrees. When the rake assembly 18 is in a working position as illustrated in FIG. 1 the rigid teeth 32 project downwardly in a rearward direction from about 15 to 20 degrees with respect to a vertical plane. This angular position of the rigid teeth permits mulch and other fine material to slide under and between adjacent teeth 32 thereby preventing their accumulation on the teeth of the comb unit. Stated otherwise, the comb unit 30 operates to separate the acorns from mulch and other fine material by moving the acorns along the surface of the ground and permitting the mulch and fine material to slide through and off of the teeth of the comb unit.

Referring to FIG. 1, it is seen that the length of the flexible tines 21 from the midsection to the free end sections 22 thereof is substantially twice the length of the rigid teeth 32 of the comb unit 30. This length relationship between the lower end portions of the flexible teeth 21 and the rigid comb teeth 32 is the basis of a unique raking action which is subsequently described in detail.

In an example of the dimensional relationships of the new combination leaf and acorn rake 16 of this invention, the rigid teeth 32 have a uniform length of three inches. The space between adjacent teeth 32 is about one-half inch. The lower end sections of the tines 21 from the midsections to the free end sections thereof is substantially 6 inches or twice the length of the rigid teeth 32.

The new combination leaf and acorn rake 16 is usable to collect the acorns 10 as shown in FIG. 1 by positioning the rake so that the comb unit 30 extends toward the ground with the free end sections 22 in engagement with the surface of the ground. In a normal operating position the handle 17 is held by a person at an angle of about 35 to 40 degrees with respect to the surface of the ground. With the handle held in this angular position the flexible spring teeth or tines 21 hold the rigid teeth 32 above the surface of the ground as indicated in broken lines in FIG. 1.

In the operation of the rake 16 the user applies a downward force on the handle 17 to flex the lower sections of the spring teeth 21 whereby the torsion spring 24 moves the comb unit 30 in a downward direction until the rigid teeth 32 engage the mulch or top surface of the ground. The comb unit 30 will remain in this position as long as a downward force is applied to the handle 17. Concurrently with the application of a downward force on the handle 17 the user moves the rake in a forward direction as indicated by the arrow 34. The rigid teeth 32 engage the acorns 10 to move them in a forward direction while the mulch and fine grasses flow between and under the teeth 32 because of the rearward and downward incline of each of these teeth.

As the mulch leaves the plurality of rigid teeth 32 it passes under the free end sections 22 of the tines 21. These free end sections are biased in a downward direction and exert a compacting action on the mulch 13 whereby the blanket of mulch 13 is returned into firm engagement with the top of the soil 12. The compacting action of the free end sections 22 is simultaneous with the raking action of the rigid teeth 32.

As shown in FIG. 5, the new combination leaf and acorn rake 16 may be inverted so that the rake assembly 18 is used to gather leaves and other light objects from the lawn 11. This is accomplished by the normal raking action of the flexible tines 21. The comb unit 30 does not hinder the flexing characteristics of the individual tines 21 when the rake is used to gather leaves.

In summary the new combination leaf and acorn rake 16 of this invention has a plurality of flexible spring teeth or tines 21 and a comb unit 30 mounted on the mid-sections of the flexible teeth. This mounting provides the comb unit with a resilient characteristic to yieldably hold the comb unit adjacent to the surface of the ground. In use the comb unit must be forced in a downward direction in order to effectuate a collection of acorns. As soon as the downward force is removed from the rake the comb unit will move upwardly out of engagement with the lawn or ground. The comb unit is mounted on the flexible teeth and extends in a downward and a rearward direction from the handle 17. This angular position of the comb unit 30 with respect to the flexible teeth 21 minimizes the collection of mulch and other fine material by the rake.

It should be understood that the foregoing disclosure relates to only a preferred embodiment of the invention, and that it is intended to cover all changes and modifications of the example of the invention herein chosen for the purposes of the disclosure which do not constitute departures from the spirit and scope of the invention.

I claim:
1. An implement for gathering together acorns resting on a ground surface comprising:
 (a) a handle member having at least one end section,
 (b) a plurality of flexible spring teeth positioned in a relative side-by-side relationship longitudinally of said handle means, said teeth having midsections and opposite end sections,
 (c) means attaching one of the end sections of said spring teeth to said end section of the handle member, and
 (d) a comb unit secured to the midsections of certain of said teeth, said comb unit having a plurality of rigid teeth spaced transversely of said spring teeth and inclined toward the other one of the end sections of said flexible spring teeth.

2. The implement defined in claim 1 wherein:
 (a) said flexible spring teeth include free end sections curved so as to form ground engaging runners.

3. An implement for gathering together acorns resting on a ground surface comprising:
 (a) a handle member having at least one end section,
 (b) a plurality of flexible spring tooth means positioned in a common plane and in a relative side-by-side relationship, said teeth means having first end sections, midsections, and second free end sections,
 (c) means extended transversely of and secured to the midsection of each tooth means,
 (d) means attaching the first end sections of said spring teeth to said end section of the handle member,
 (e) spring means connected to said transverse means and said end section of the handle member and operable to bias said flexible spring tooth means in said common plane,
 (f) a comb unit having a back section and a plurality of rigid teeth projected from and spaced along the back section, and
 (g) means for securing the back section of the comb unit to said transverse means with the rigid teeth thereof lying in a plane which forms an acute angle with the free end sections of the flexible spring tooth means.

4. The implement defined in claim 3 wherein:
 (a) the length of said spring tooth means from the midsection to the free end is substantially twice the length of said rigid teeth.

5. A rake assembly mountable on a support comprising:
 (a) a plurality of flexible spring tooth means positioned in a common plane, said tooth means having midsections and free end sections,
 (b) means extended transversely of and secured to the midsection of each tooth means,
 (c) a comb unit having a back section and a plurality of rigid teeth projected from and spaced along the back section, and
 (d) means for securing the back section of the comb unit to said transverse means with the rigid teeth thereof lying in a plane which forms an acute angle with the free end sections of the flexible spring tooth means.

6. The rake assembly defined in claim 5 wherein:
(a) the length of said spring tooth means from the mid-section to the free end is substantially twice the length of said rigid teeth.

7. A rake assembly mountable on a support comprising:
(a) a plurality of flexible spring tooth means positioned in a common plane, said teeth means having free end sections,
(b) a comb unit extended transversely of said tooth means, said comb unit having a back section and a plurality of rigid teeth projected from and spaced along the back section, and
(c) means for securing the back section of the comb unit to certain ones of said tooth means with the rigid teeth thereof inclined toward the free end sections of said flexible spring teeth so as to lie in a plane which forms an acute angle with said free end sections.

8. A rake assembly mountable on a support comprising:
(a) a plurality of flexible spring tooth means positioned in a common plane and in a relative side-by-side relationship, said tooth means having midsections, and free end sections,
(b) means extended transversely of and secured to the midsections of the spring tooth means,
(c) spring means connected to said transverse means and said support and operable to bias said flexible spring tooth means in a said common plane,
(d) a comb unit having a back section and a plurality of rigid teeth projected from and spaced along the back section, and
(e) means for securing the back section of the comb unit to said transverse means with the rigid teeth thereof lying in a plane which forms an acute angle with the free end sections of the flexible spring tooth means.

9. The rake assembly defined in claim 8 wherein:
(a) the length of said spring tooth means from the mid-section to the free end is substantially twice the length of said rigid teeth.

10. A rake assembly for raking acorns and the like on a ground surface, including:
(a) an elongated handle,
(b) flexible tooth means having curved end sections, and opposite end sections,
(c) means mounting the opposite end sections of said tooth means to one end of said handle, with the tooth means arranged in a spaced relation and extended longitudinally of said handle means,
(d) a comb unit extended transversely of said tooth means between the end sections thereof,
(e) means securing said comb unit to certain ones of said tooth means, and
(f) a plurality of rigid teeth projected from and spaced longitudinally of said comb unit, with said teeth extending downwardly and rearwardly when the convex sides of said curved end portions are in engagement with the ground.

References Cited by the Applicant
UNITED STATES PATENTS

| | | | |
|---|---|---|---|
| 1,200,690 | 10/1916 | Arrison | 56—400.07 |
| 1,467,212 | 9/1923 | Walsh | 56—400.14 |
| 1,536,742 | 5/1925 | Anderson et al. | 56—400.14 |
| 1,591,738 | 7/1926 | Bell | 56—400.16 |
| 2,137,795 | 11/1938 | Bailie | 56—400.17 |
| 2,301,524 | 11/1942 | Cooper | 56—400.13 |
| 2,316,168 | 4/1943 | James | 56—400.17 |
| 2,766,577 | 10/1956 | Dorman | 56—400.17 |

ABRAHAM G. STONE, *Primary Examiner.*
RUSSELL R. KINSEY, *Examiner.*